United States Patent [19]

Ota

[11] Patent Number: 4,998,626

[45] Date of Patent: Mar. 12, 1991

[54] MAIL PROCESSING MACHINE

[75] Inventor: Naoki Ota, Kanagawa, Japan

[73] Assignee: Kabushiki Kaisha Toshiba, Kanagawa, Japan

[21] Appl. No.: 216,287

[22] Filed: Jul. 8, 1988

[30] Foreign Application Priority Data

Jul. 8, 1987 [JP] Japan ............................... 62-170198

[51] Int. Cl.⁵ ........................ B07C 5/342; G06K 9/00

[52] U.S. Cl. .................................... 209/584; 209/900; 382/1; 382/9

[58] Field of Search ............... 209/540, 545, 546, 583, 209/584, 900; 382/1, 9

[56] References Cited

U.S. PATENT DOCUMENTS

| | | | |
|---|---|---|---|
| 3,432,032 | 3/1969 | Curphey et al. | 382/1 X |
| 3,983,366 | 9/1976 | Gunn . | |
| 4,034,341 | 7/1977 | Isono et al. | 382/1 |
| 4,158,835 | 6/1979 | Miura et al. | 209/900 X |
| 4,475,234 | 10/1984 | Nishijima et al. | 382/1 |
| 4,516,264 | 5/1985 | Corvari et al. | 382/1 X |
| 4,520,932 | 6/1985 | Matsuda et al. | 209/900 X |
| 4,736,441 | 4/1988 | Hirose et al. | 209/900 X |
| 4,910,787 | 3/1990 | Umeda et al. | 382/9 X |

FOREIGN PATENT DOCUMENTS

| | | |
|---|---|---|
| 0076332 | 4/1983 | European Pat. Off. . |
| 0085567 | 8/1983 | European Pat. Off. . |
| 2214592 | 8/1974 | France . |
| 61-272891 | 12/1986 | Japan . |

OTHER PUBLICATIONS

"*Development of Bi-Functional OCR*", Sugita et al., NEC Research & Development. No. 60 Jan. 1981.

*Primary Examiner*—Dennis H. Pedder
*Assistant Examiner*—Edward M. Wacyra
*Attorney, Agent, or Firm*—Finnegan, Henderson, Farabow, Garrett and Dunner

[57] ABSTRACT

A mail processing machine for sorting mail according to whether the characters of the destination address are printed or handwritten. The mail processing machine reads information of the surface of the mail and distinguishes the area of the destination address from the area of the sender address. The machine has a recognizer to determine printed or handwritten address according to the dispersion (i.e. the statistical variation) of a characteristic of the letters such as the height of letters, the space between letters or lines etc. In this operation, the recognizer calculates the dispersion using the signals corresponding to only the bottom two lines of the address area, which contain important information.

7 Claims, 8 Drawing Sheets

MAIL PROCESSING MACHINE

BACKGROUND OF THE INVENTION

The present invention relates to mail processing apparatus and more particularly to apparatus for sorting mail according to whether the address characters of the mail are printed or hand-written.

Mail having address characters which are printed are further sorted with respect to ZIP codes by an optical character reader (OCR), while mail determined to have handwritten characters are sorted with respect to ZIP codes by hand.

Mail sorting machines sort mail according to the address, using pattern recognition methods. Pattern recognition methods are effective for printed characters, but not effective for hand-written characters. Therefore, only mail with printed address characters can be supplied to mail sorting machines because the mail sorting machines are required to accurately recognize address characters.

SUMMARY OF THE INVENTION

It is accordingly an object of the present invention to provide mail processing apparatus which automatically classifies pieces of mail as having a printed address or another type of address.

It is another object of the present invention to provide mail processing apparatus which classifies pieces of mail as having a printed address or another type of address using fewer calculations.

The present invention overcomes the problems and disadvantages of the prior art by reading information on the surface of the mail and distinguishing the area of the destination address from the area of the return address. The statistical variation (i.e., the dispersion) of a characteristic of characters forming only a portion of the destination address is determined, and the mail is classified as having either a printed address or a handwritten address on the basis of the dispersion of the characteristic.

To achieve the objects and in accordance with the purposes of the invention, as embodied and broadly described herein, there is provided apparatus for processing mail having a destination address area including a destination address consisting of a plurality of characters and for selecting mail having a printed destination address. The apparatus comprises means for detecting the position of the destination address area on a piece of mail, means for generating signals representative of characters within the destination address area, means for calculating the dispersion of a characteristic of the characters within only a portion of the destination address area, means for comparing the calculated dispersion to a predetermined limit, and means for selecting the piece of mail as having a printed address when the dispersion is less than the predetermined limit.

The accompanying drawings, which are incorporated in and constitute a part of this specification, illustrate one embodiment of the invention, and, together with the description, serve to explain the principles of the present invention.

DETAILED DESCRIPTION OF THE PREFERRED EMBODIMENTS

An embodiment of the mail address processing machine according to the present invention will be described below with reference to the attached drawings.

Figure 2:
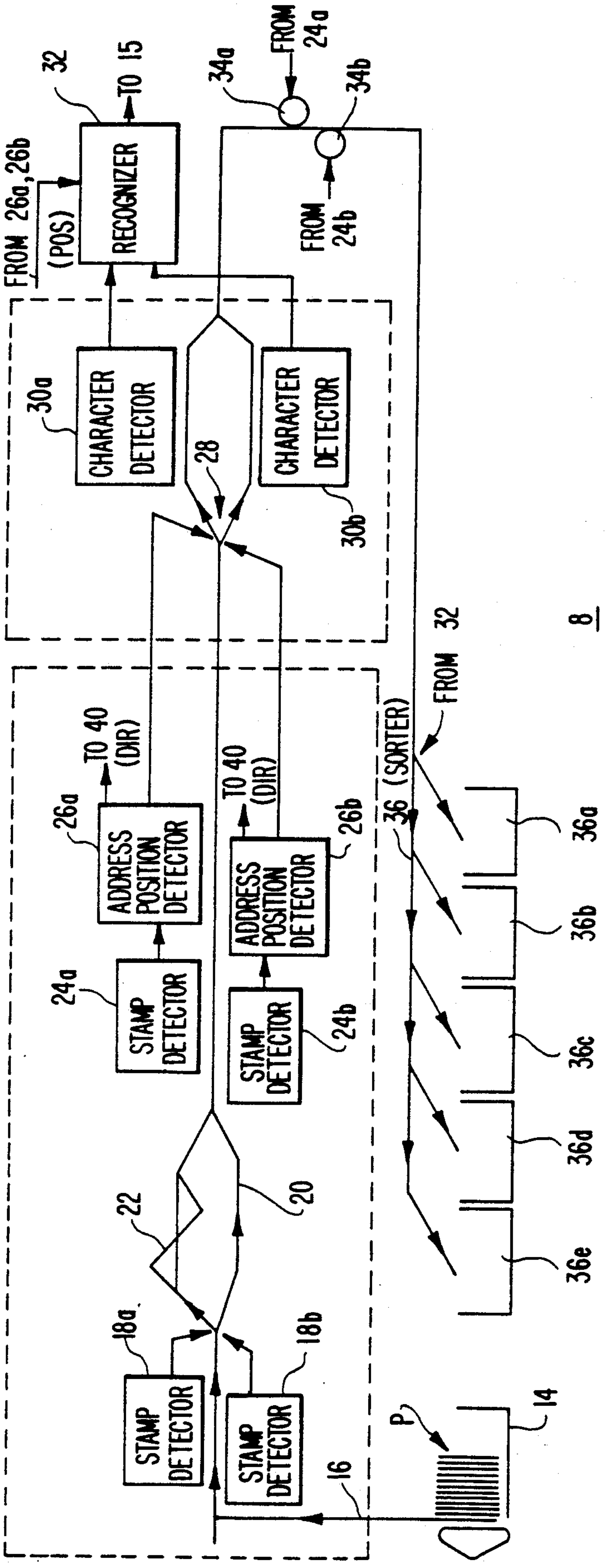
FIG. 2 is a diagrammatical view of a mail processing machine which constitutes a preferred embodiment of the present invention.

FIG. 2 is a diagrammatical view of a mail processing machine 8 which reads a ZIP code and an address written on each piece of mail, discriminates whether the address characters are printed or handwritten, cancels the stamp, and sorts the mail into a first group of mail having printed addresses and a second group of mail having handwritten addresses. The first group is further sorted automatically by a ZIP code reader, while the second group is further sorted manually according to ZIP codes.

Figure 3:
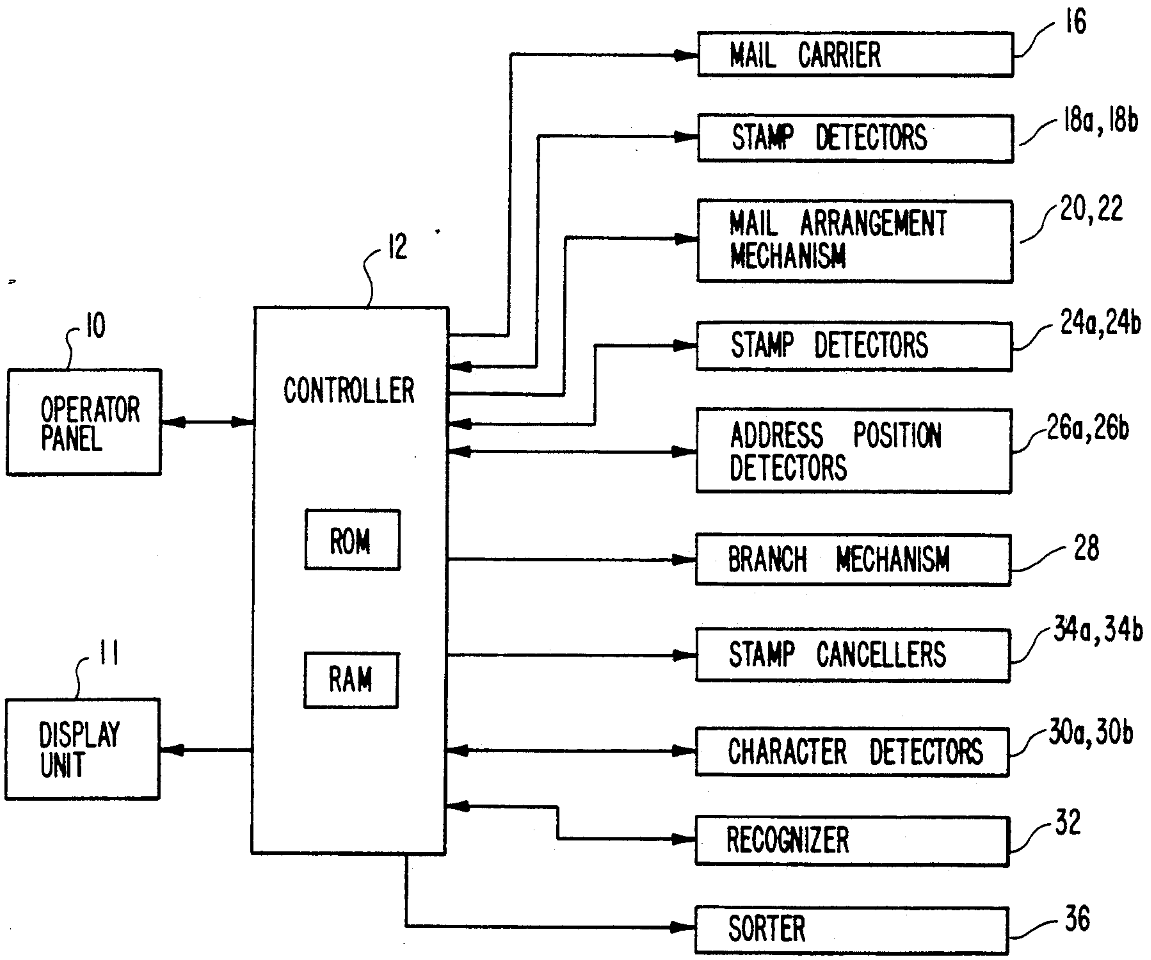
FIG. 3 is a block diagram showing the machine of FIG. 2.

Mail processing machine 8 shown in FIGS. 2 and 3 comprises an operator panel 10, a display unit 11, a controller 12, a mail receiver 14, a mail carrier 16, two stamp detectors **18*a* and 18*b*, a non-inversion path 20, an inversion path 22, a second pair of stamp detectors 24*a* and 24*b*, and a pair of address position detectors 26*a* and 26*b***.

The invention thus includes means for detecting the position of a destination address area which contains the destination address on a piece of mail. As embodied herein, the detecting means comprises postage stamp detectors **18*a* and 18*b*, non-inversion path 20, inversion path 22, two postage stamp detectors 24*a* and 24*b*, and two address position detectors 26*a* and 26*b***.

The invention also includes means for generating signals representative of characters within the destination address area. As embodied herein, the generating means includes a branch mechanism 28 and two character detectors **30*a* and 30*b***.

The invention further includes means for calculating the statistical variation (i.e., the dispersion) of a characteristic of the characters within the destination address area for comparing the calculated dispersion to a predetermined limit, and means for selecting the piece of mail as having a printed address when the dispersion is less than the predetermined limit. As embodied herein, the calculating, comparing, and selecting means includes a recognizer 32.

Characters of the address present on mail such as is handled by machine 8 can be described in terms of specific characteristics such as height, spacing, position above or below a line, pitch, etc. Each of these characteristics exhibits a certain variation, or dispersion, from an average. It can be readily appreciated, however, that dispersion of printed address characters will be less than dispersion for handwritten characters.

Mail processing machine 8 further includes two stamp cancellers 34*a* and 34*b*, and a sorter 36 including several mail sorting boxes 36*a* to 36*e*.

A stack of mail is arranged in mail receiver 14. Each piece of mail arranged in mail receiver 14 is fed one-by-one to postage stamp detectors 18*a* and 18*b* in a vertical mail position.

Figure 4:
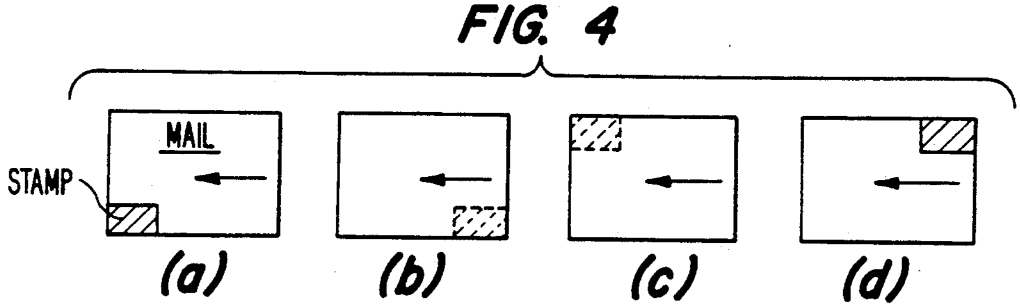
FIG. 4 is a diagram illustrating four possible orientations of mail fed into the machine shown in FIG. 2.

When a postage stamp is attached to a corner of a piece of mail, four different positions (a), (b), (c) and (d) are possible, as shown in FIG. 4, in which solid lines outlining a stamp indicate that a stamp is attached on the front surface side of a piece of mail, and dashed lines indicate that a stamp is attached on the back surface side of a piece of mail. Here, stamp detectors 18*a* and 18*b* are arranged to detect the stamp only when the stamp is located at the lower ends of the mail as depicted by (a) and (b) in FIG. 1, respectively. That is, the stamp attached as at (a) in FIG. 4 can be detected by stamp detector 18*a*, and that attached at (b) in FIG. 4 can be detected by stamp detector 18*b*. When a stamp is detected as depicted at (a) or (b) in FIG. 4, the mail is fed through a non-inversion path 20. However, when detectors 18*a* and 18*b* cannot detect the presence of a stamp, the stamp may be located at the upper ends of the mail, as depicted by (c) and (d) in FIG. 4, or the piece of mail may have no stamp. In this case, the mail is fed through an inversion path 22 to reverse the mail upside down so that the stamp is always positioned as shown by (a) or (b) in FIG. 4. In more detail, when the stamp is located as (c) and reversed, the piece of mail becomes positioned as at (a); when the stamp is located as at (d) and reversed, the piece of mail becomes positioned as at (b) in FIG. 4.

The mail arranged with the stamp located on the lower side thereof is then fed to the next two stamp detectors 24*a* and 24*b* to detect the presence or absence of the stamp. Therefore, when stamp detector 24*a* or 24*b* detects the presence of a stamp, it is possible to determine that the address is written on the side on which at least one stamp is affixed.

The address position detector 26*a* or 26*b* detects the address character position on the front surface of a piece of mail on which an address is written, on the basis of mail surface information. That is, when the presence of a stamp is detected by stamp detector 24*a* or 24*b*, address position detector 26*a* or 26*b* next detects the presence of an address window covered by cellophane or an address label on which an address is written, in order to detect a mail address area where a destination address is written. When the presence of a stamp is not detected by either stamp detector 24*a* or 24*b*, the quantity or the extent of characters written on one surface of the piece of mail is compared with that on the other surface of the same piece of mail by address position detectors 26*a* and 26*b* in order to determine the front or back surface of the mail. That is, the surface on which the most characters are written is determined to be the front surface of the mail.

On the basis of the detected window or label position and the quantity of characters, it is possible to detect the front side or back side of the mail and the address position or area where an address is written. Thus, even when stamp detector 24*a* and 24*b* cannot detect the presence of a postage stamp, the front surface of the mail is determined on the basis of the address window by address position detectors 26*a* and 26*b*. The quantity of the address characters can be determined by integrating the image signals indicative of address characters.

When address position detector 26*a* detects the front of the piece of mail, branch mechanism 28 is actuated so that the mail fed to character detector 30*a*. On the other hand, when address position detector 26*b* detects the front of a piece of mail, branch mechanism 28 is actuated so that the mail is fed to character detector 30*b*.

Figure 5:
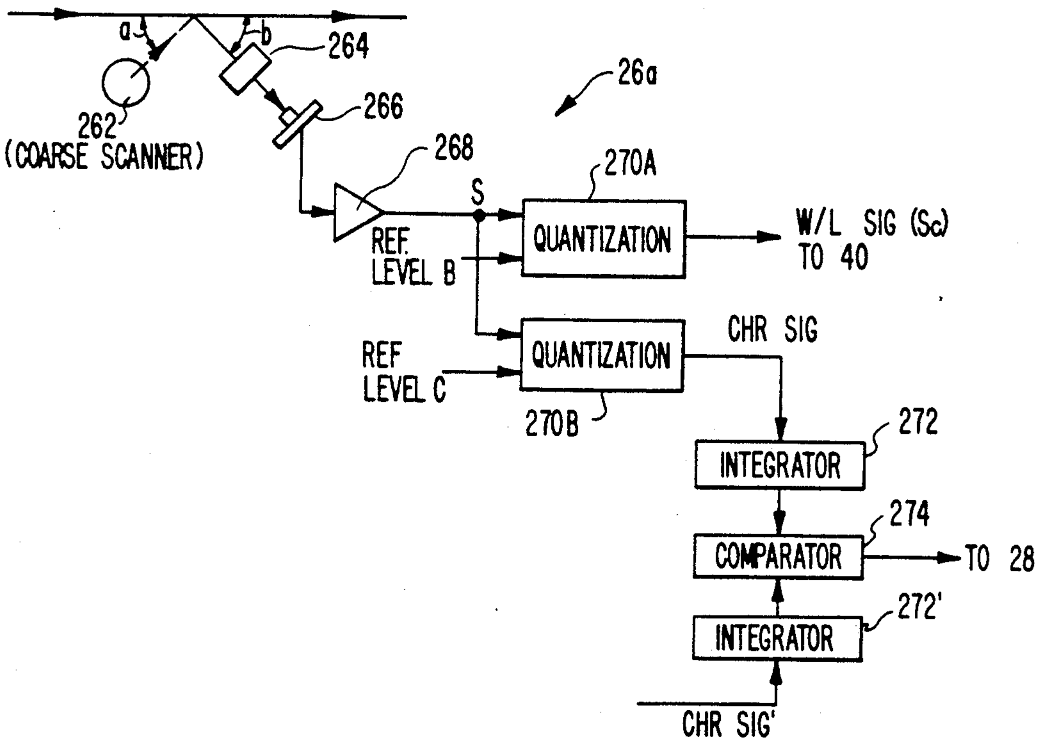
FIG. 5 is a diagrammatical view showing address position detectors of FIG. 2.

As shown in more detail in FIG. 5, address position detectors 26*a* and 26*b* each comprise a light source 262 for emitting a light beam toward a piece of mail fed through a carrying path for scanning, a lens 264 for focusing the light scattered by the mail, a photosensitive element 266 composed of a line image sensor (e.g. a charge coupled device) for detecting characters written on the mail, an amplifier 268 for producing a detected character image signal S, and two quantization circuits 270A and 270B. Light source 262 and lens 264 are both disposed relative to the mail in such a way that the incidence angle a is roughly equal to the reflection angle b. Quantization circuit 270A compares the image signal S detected by photosensitive element 266 with a reference level B outputted from a controller (not shown in FIG. 5), and outputs a high level signal, called a window/label signal (W/L SIG), indicative of the presence of a window or label having a high reflectivity when the level of image signal S exceeds the reference level B as shown by image signal Sc in FIG. 6.

Figure 6:
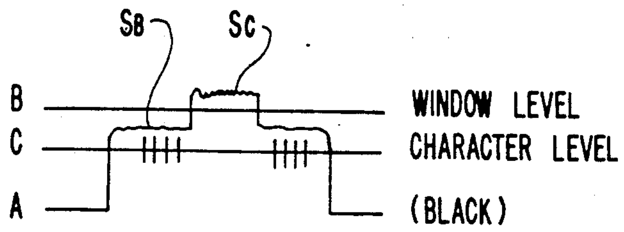
FIG. 6 is a graphical representation showing signal levels of information detected by the address position detectors of FIG. 5.

Quantization circuit 270B compares image signal S with a reference level C also outputted from a controller (not shown in FIG. 5) and outputs a character signal (CHR SIG) at a low level when the level of the image signal S lies between the reference B and C, that is, when the paper surface exhibits a middle reflectivity. This is indicated in FIG. 6 by the portion of image signal S designated by $S_B$. A low level of CHR SIG is indicative of the absence of characters.

Further, when the level of image signal S lies between reference levels C and A, that is, when the paper surface exhibits a low level reflectivity, the quantization circuit 270B outputs a high level CHR SIG which is indicative of the presence of characters.

In FIG. 6, reference level A corresponds to the level of image signal S which is generated when the surface being monitored is deep black.

In address position detector 26*a* or 26*b*, the resolving power of scanning is not high (e.g., a single scanning line per millimeter) because this detector detects only the position of an address window/label. The window/label position can be detected in the form of (x, y) coordinates indicative of the number of the horizontal scanning line from an upper edge and a time period from the beginning of scanning of the horizontal scanning line, for instance.

When no postage stamp and no address window/label are detected, a low level character signal CHR SIG outputted from quantization circuit 270B is integrated by an integrator 272 and supplied to a comparator 274. However, a high level CHR SIG is not integrated.

Another character signal CHR SIG′ outputted from another quantization circuit corresponding to address position detector 26*b* is integrated by an integrator 272′ and also supplied to the comparator 274. Comparator 274 compares these two integrals of character signals to determine the front side of a piece of mail where an address is supposed to be written. For instance, if the number of character signals integrated by integrator 272 is larger than the number integrated by integrator 272', comparator 274 generates a command signal to branch mechanism 28 to feed the mail toward character detector 30*a*. In response to this command signal, character detector 30*a* is activated to detect the character image.

Figure 7:
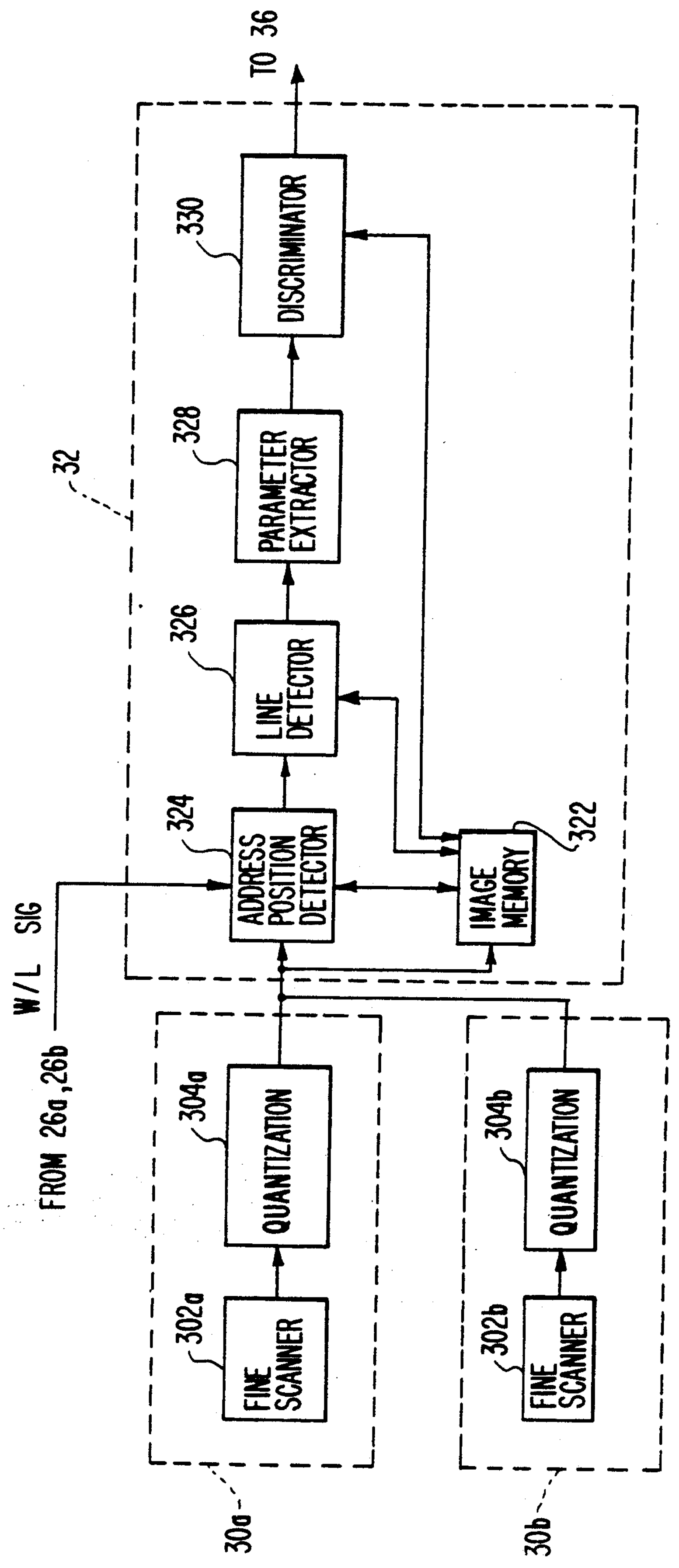
FIG. 7 is a diagrammatical view showing the character detector and recognizer of FIG. 2.

FIG. 7 shows character detectors 30*a* and 30*b* and recognizer 32. Each character detector 30*a* or 30*b* comprises a fine scanner 302*a* or 302*b* and a quantization circuit 304*a* or 304*b*. Fine scanner 302*a* or 302*b* generates image signals in almost the same way as address position detector 26*a* or 26*b* by irradiating the mail surface with a light beam and transducing the reflected light beam (not the scattered light beam) by photosensitive elements into image signals. However, the resolving power of the fine scanner 302*a* or 302*b* is as high as 8 lines per millimeter because this detector detects the features of characters.

Quantization circuit 304*a* or 304*b* compares the detected mail surface image signals with a predetermined reference level and outputs character image signals only when the image signal drops below a reference level (the above processing being referred to as binarization).

Recognizer 32 comprises an image memory 322, an address position detector 324, a line detector 326, a parameter extractor 328, and a discriminator 330.

Image memory 322 stores all the scanned and binarized character image signals detected by one of character detectors 30*a* or 30*b* because the front surface of a piece of mail has been detected by address position detectors 26*a* and 26*b*. The detected mail is fed to one of character detectors 30*a* and 30*b*. Therefore, image memory 322 stores the character image signals corresponding to the detected front surface of a piece of mail that are detected by either character detector 30*a* or 30*b*.

Figure 9:
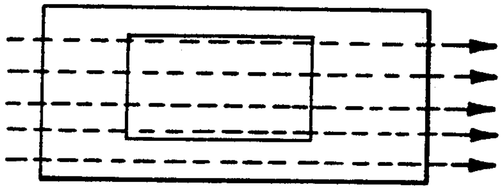

Line detector 326 functions as follows. The preceeding processing operations have already detected an address position or area where an address is written. Therefore, in this step, character lines are further detected from the detected address area. That is, since an area where characters are gathered has already been determined, the succeeding step determines how the character area is arranged within the detected address area. Line detector 326 reads image memory 322, which stores a plurality of signals in order of scanning, as shown by dotted lines in FIG. 9. The direction of the dotted lines is called direction X, and the direction perpendicular to direction X is called direction Y. The surface of the piece of mail is described according to X,Y coordinates.

Figure 8:
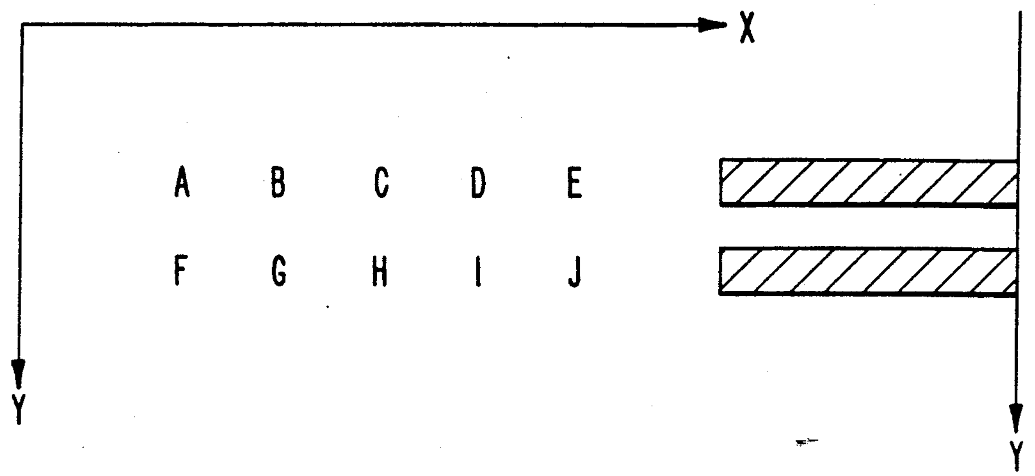
FIG. 8 to 12 are diagrams illustrating the separation of lines and characters by recognizer shown in FIG. 2.

By doing this, the number of character image signals are counted along the conveying direction X in order to obtain a histogram, as shown in FIG. 8. By detecting the minimum of the histogram indicative of the distribution of the character image signals, it is possible to separate each of the address lines so that the position number of the coordinates is obtained.

Parameter extractor 328 detects character feature parameters. These parameters are dispersions of various character features such as (1) character height; (2) character lower edge position; (3) character width; (4) character pitch; (7) leftmost character position; (8) line spacing, etc.

Figure 10:
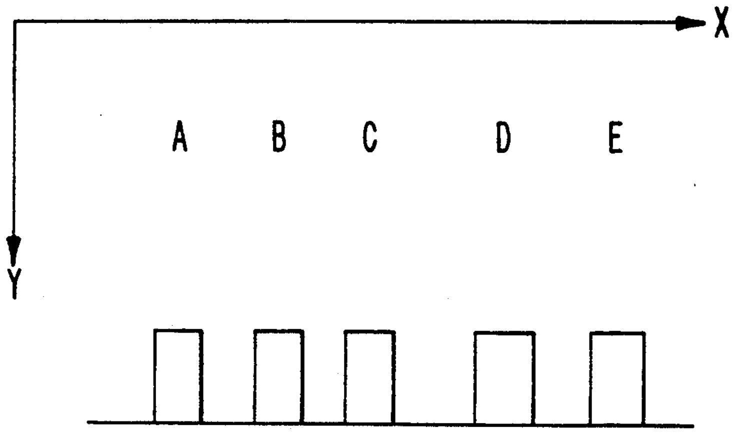
Figure 11:
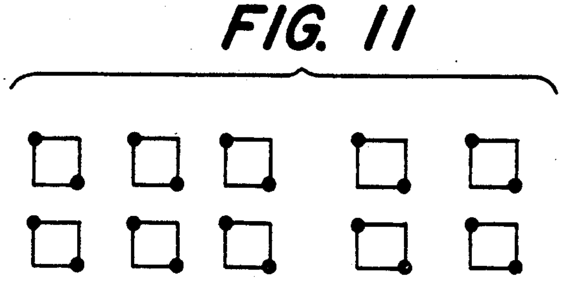

To obtain character feature parameters, each character area is separated within a line in an address area. In more detail with reference to FIG. 9, the number of image signals are counted along a direction Y perpendicular to an address line. By detecting the minimum of the histogram indicative of the distribution of the image signals, it is possible to separate each of the characters so that the position number of the coordinate is obtained. It is possible to locate each character with the position numbers of the ordinate and abscissa, as shown in FIG. 10.

Figure 12:
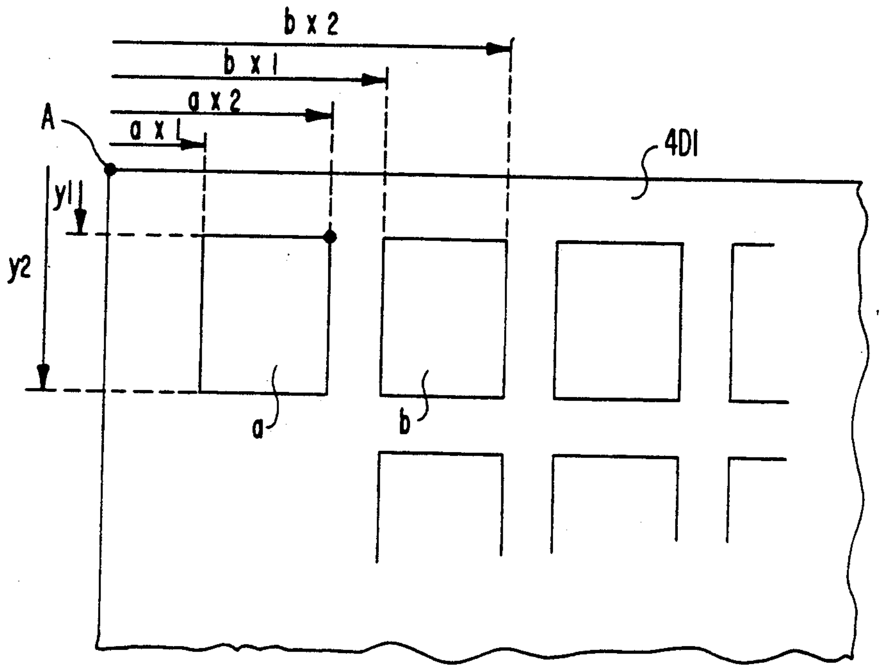

For example, as shown in FIG. 12, an address area 4D1 is specified by address position detectors 26*a*, 26*b* as an area with the upper leftmost position A and a lower rightmost position (not shown). The location of a particular character is specified with the upper left position and the lower rightmost position based on a coordinate system with reference to A. The character area for character a is specified with the coordinates $(a_{x1}, y_1)$ and $(a_{x2}, y_2)$, The dispersion $\sigma_L^2$ of character features is calculated according to the following formula:

$$\sigma_L^2 = 1/N\,(X_{Li} - \overline{X_{Li}})^2$$

Where:

N = the number of characters;

L = the character feature such as height, lower edge position, width, pitch, area, line arrangement slope, leftmost position, line spacing, etc.

$X_{Li}$ = the value of the character feature of each character.

$\overline{X_{Li}}$ = the average value of the character feature of characters.

Figure 13:
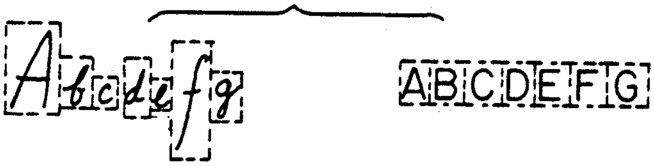
FIG. 13 to 17 are diagrams illustrating dispersion of characteristics of address characters.
Figure 14:
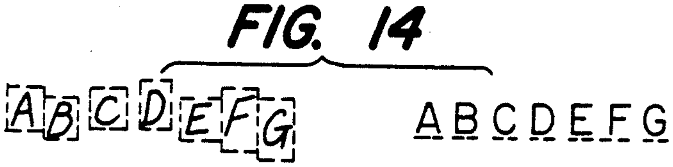
Figure 15:
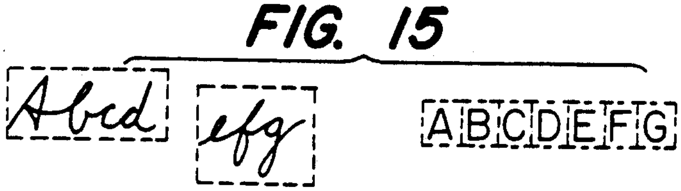
Figure 16:
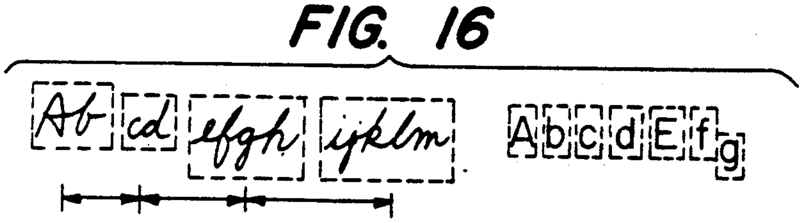
Figure 17:
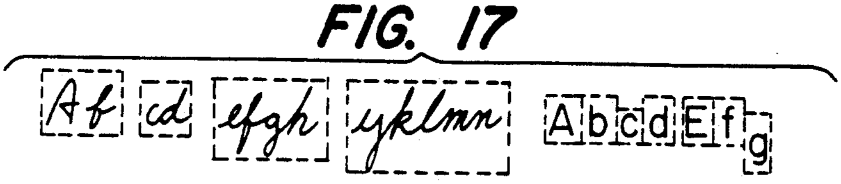

Generally speaking, $\sigma_L^2$ is larger for handwritten characters than that for printed characters. FIG. 13 shows an example of the dispersion of character height $\sigma_H^2$ in printing and in handwriting. FIGS. 13–17 respectively show examples of dispersion of character lower edge, character width, character pitch, and the character area.

When calculating these feature parameters, all of the position numbers for the characters are generally used. However, calculations of such dispersion values is a burden for a processor (CPU). Such calculations require long calculation times, a high-speed processor, or both.

In a preferred embodiment, parameter extractor 328 may detect character parameters on the basis of signals from a limited or restricted area within the address area. In the preferred embodiment, the restricted area is the lower two lines of the address area, an area containing important information about the destination address.

A reference threshold value $\sigma_O^2$ for the dispersion of each of the character features is previously determined. Each actual dispersion value $\sigma_L^2$ calculated using image signals read from image memory 322 is compared with this reference threshold value $\sigma_O^2$. The compared result (the difference between the actual dispersion and the reference dispersion) is stored in the image memory 322 and added in sequence to obtain a sum total of the differences between two of the above-mentioned eight character features. When discriminator 330 determines that the sum total of the dispersion differences between the actual values and the reference values exceeds a predetermined value, the characters are designated as handwritten. In contrast, when discriminator 330 determines that the sum total of the dispersion differences is less than the predetermined value, the characters are designated as printed.

Figure 18:
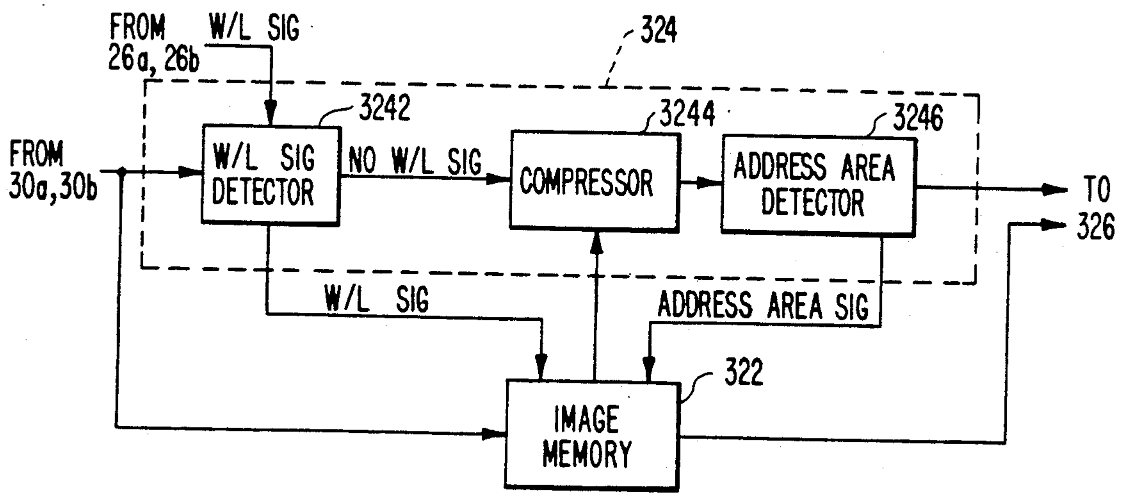
FIG. 18 is a diagrammatical view of the recognizer detector shown in FIG. 7.

FIG. 18 is a block diagram showing address position detector 324, which comprises a W/L signal detector 3242, a compressor 3244, and an address area detector 3246. When W/L signal detector 3242 detects the presence of a W/L signal indicative of a window/label position (x-y coordinates), image data corresponding to only the window/label position from the image memory 322 is supplied to line detector 326.

When the W/L signal detector 3242 detects an absence of the W/L signal, compressor 3244 reads all of the image signals from image memory 322 for compression. For example, the resolving power of the image signals may be reduced from 8 lines per millipower meter to 1 line per millimeter by simply averaging eight horizontal scanning line signal levels. The address area detector 3246 compares the averaged signal levels with a reference level for binarization in the same manner as quantization circuit 270, and determines an address character area on the basis of the binarized character image signals collected at an area on the front surface of a piece of mail. When this address character area has been detected, the image data corresponding to only the determined address character area is supplied to line detector 326.

When stamp detector 24*a* or 24*b* detects the presence of a postage stamp on the piece of mail, a stamp canceller 34*a* or 34*b* corresponding to the stamp detector 24*a* and 24*b* impresses a mark on the detected postage stamp. The mail thus detected is sorted and put into five sorting boxes 36*a* to 36*e* in such a way that: mail having an address written in print and detected by character detector 30*a* is arranged in box 36*a*, mail having an address written in handwriting and detected by character detector 30*a* area is arranged in box 36*b*, mail having an address written in print and detected by character detector 30*b* is arranged in box 36*c*, mail having an address written in handwriting and detected by character detector 30*b* area arranged in box 36*d*, and other mail determined to be rejected is arranged in box 36*e*.

In the machine of the present invention, it should be noted that since address position detectors 26*a* or 26*b* can detect a window/label position and the front side of the mail (by comparing the quantity of characters), and further, since address position detector 324 can determine an address character area, character images corresponding to only the front surface of the mail and only to the address position (window or label) or address character area can be read from the image memory 322 for discrimination. Therefore, character image data to be analyzed is not voluminous, making it possible to increase mail processing speed and decrease the cost of the machine by providing only a single recognizer 32 including discriminator 330.

Figure 1:
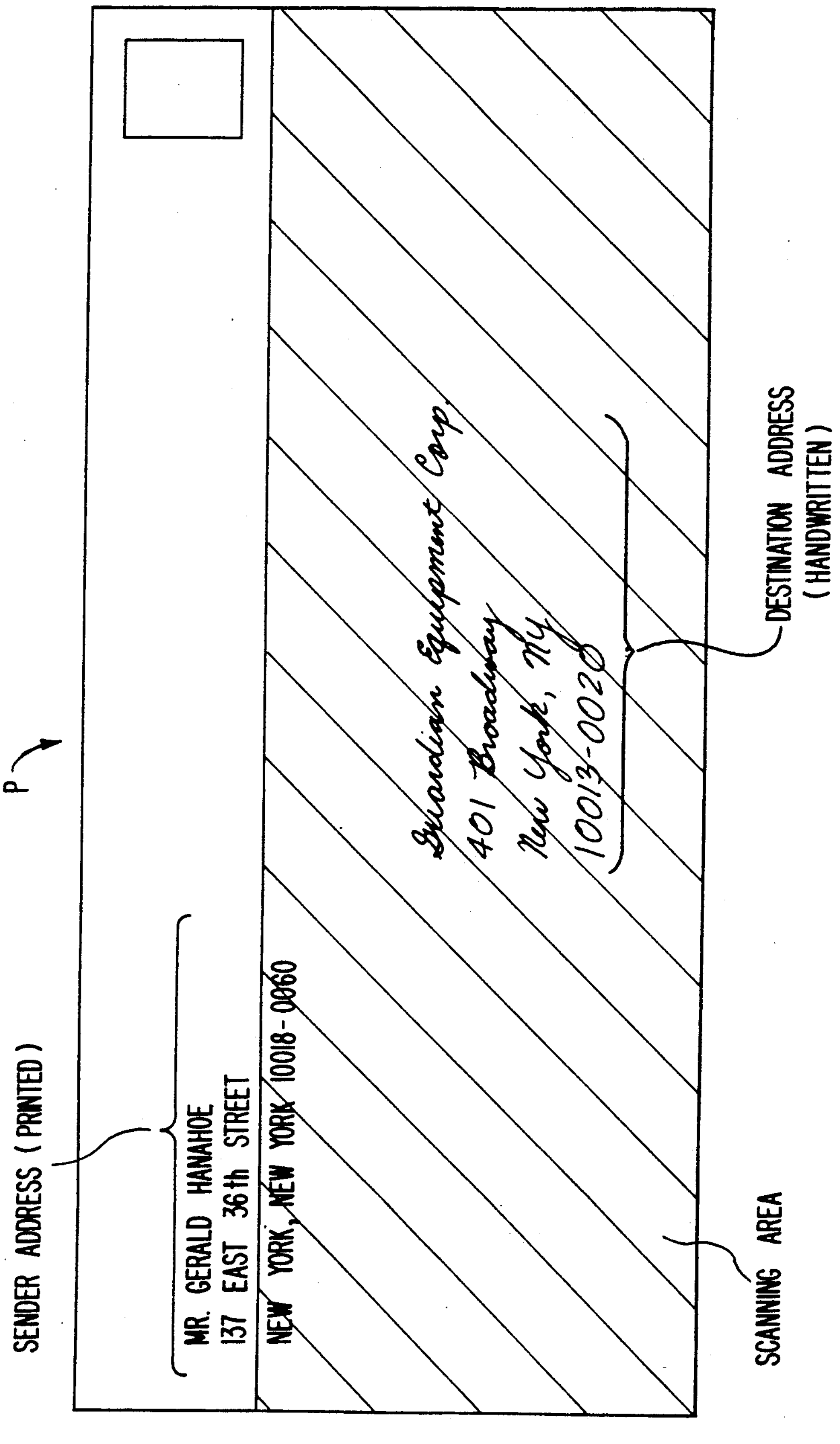
FIG. 1 is a plan view of a piece of mail including a destination address and a return address.

The operation of the mail processing machine of the present invention for a piece of mail P as shown FIG. 1 will now be described with reference to FIG. 2.

Mail P is arranged in receiver 14 and fed to stamp detectors 18*a* and 18*b* by carrier 16 in a vertically arranged position. When stamp detectors 18*a* or 18*b* detect the presence of a stamp attached to the lower side of the mail, the mail is fed through the non-inversion path 20. When stamp detectors 18*a* and/or 18*b* detect the absence of a stamp, the mail is fed through inversion path 22. Thereafter, stamp detector 24*a* and 24*b* detect the presence or absence of a stamp, and generate a stamp presence signal which is applied to stamp canceller 34*a* or 34*b* to impress a mark on the stamp of the mail just before sorting the mail.

When no stamp is detected by stamp detectors 24*a* and 24*b*, the front side of the mail (on which an address is written) is detected by address detectors 26*a* and 26*b*.

Address position (surface information) detector 26*a* or 26*b* also detects the position of a window or a label. In this process, when address position detector 26*a* detects a mail front, branch mechanism 28 is actuated so that the mail is fed to character detector 30*a*. When address position detector 26*b* detects a mail front, branch mechanism 28 is actuated so that the mail is fed to character detector 30*b*.

Since the front surface of a piece of mail has been detected by address position detectors 26*a* and 26*b*, the detected mail is fed to either character detector 30*a* or 30*b*. Character detector 30*a* or 30*b* detects characters on the front surface of the mail by scanning and quantization. The detected character image signals corresponding to the address position signals (window/label signal) are supplied from image memory 322 (FIG. 7) to line detector 326 on the basis of the window/label signal detected by address position detector 26*a* or 26*b*.

The character features (e.g., arrangement order, regularity, size, density, etc.) of the character images are detected by parameter extractor 328 of recognizer 32 and discriminated as to printed mail or handwritten mail by comparing the extracted character features with stored reference character values.

For a piece of mail P for which no window/label signal is detected, address position detector 324 determines an address area by compressing all of the surface image signals and binarizing the compressed signals.

The process of separating each of the lines of characters is done for the signals of the destination address. Thus, the signals are separated into many groups of signals corresponding to lines. As mentioned above, the signals corresponding to a line are separated into a group of signals corresponding to each character. In the preferred embodiment, signals corresponding to only the two bottom lines are used in discrimination.

After compression, signals exceeding the threshold value may indicate the existence of several groups of signals. These groups of signals may come from the destination address, a sender address, an advertisement, and so on. For mail P, there are two areas of signals. Since the destination address is normally to the right of the return address when there is a stamp on the right-upper corner of a piece of mail, and since it is known that there is a stamp on the right-upper side of the mail P in FIG. 1, it is determined that the right hand area is the destination address.

The mail thus discriminated is sorted into one of the sorting boxes 36*a* to 36*e*.

In the above description, the mail processing machine of the present invention has been disclosed with reference to block diagrams (i.e., a hardware configuration). In practice, mail processing machine 8 is controlled by controller 12 provided with a ROM, a RAM, a display unit, and a keyboard (not shown).

As described above, in the mail processing machine of the present invention, since the surface information (window or label position, quantity of characters, character block position) is first detected and then used to analyze only a portion of the character image signals to determine whether the address characters are in printing or handwriting, it is possible to improve the sorting speed of the mail, while reducing the cost of the machine.

It will be apparent to those skilled in the art that various modifications and variations ca be made in the apparatus and methods of this invention without departing from the spirit or scope of the present invention. The present invention covers such modifications and variations which are within the scope of the appended claims and their equivalents.

What is claimed is:

1. Apparatus for selecting pieces of mail having a printed destination address from among pieces of mail having printed and handwritten destination addresses, wherein the mail pieces have an undelineated destination address area including a destination address consisting of a plurality of alpha-numeric characters, the apparatus comprising:

means for detecting the position of only the undelineated destination address area on a piece of mail;

means for scanning only a portion of the undelineated destination address area and for generating signals representative of alpha-numeric characters within the scanned portion of the undelineated destination address area;

means for calculating the dispersion of a characteristic of the alpha-numeric characters within the scanned portion of the destination address area;

means for comparing the calculated dispersion to a predetermined limit; and means for selecting the piece of mail as having a printed address when the dispersion is less than the predetermined limit.

2. Apparatus as recited in claim 1, wherein the means for detecting the position of the destination address area comprises means for detecting the position of a high reflectivity portion of the piece of mail and for specifying the high reflectivity portion as the destination address area.

3. Apparatus as recited in claim 1, wherein the means for calculating the dispersion comprises means for calculating the dispersion of a characteristic of the characters which is selected from the characteristics of character height, character lower edge position, character width, character pitch, leftmost character position, and character line spacing.

4. A method for selecting pieces of mail having a printed destination address from among pieces of mail having printed and handwritten destination addresses wherein the mail pieces have destination information located in an undelineated destination address area and in a postal code frame area having postal code frames adapted for the inscription therewithin of postal code information, the method comprising the steps of:

(a) detecting the position of only the destination address area of the destination information on a piece of mail;

(b) scanning only a portion of the destination address area and generating signals representative of alpha-numeric characters within the scanned portion of the destination address area;

(c) calculating the dispersion of a characteristic of the alpha-numeric characters within the scanned portion of the destination address area;

(d) comparing the dispersion to a predetermined limit; and (e) selecting the piece of mail as having a printed address when the dispersion is less than the predetermined limit.

5. A method as recited in claim 4, wherein the detecting step comprises the steps of detecting the position of a high reflective portion of the piece of mail and specifying the high reflective portion as the destination address area.

6. A method as recited in claim 4, wherein the calculating step comprises the step of calculating the dispersion of a characteristic of the characters which is selected from the characteristics of character height, character lower edge position, character width, character pitch, leftmost character position, and character line spacing.

7. Apparatus for selecting pieces of mail having a printed destination address from among pieces of mail having printed and handwritten destination addresses wherein the mail pieces have a destination address area including a destination address consisting of a name, a street name, a city name, and a state name, the apparatus comprising:

means for detecting the position of the destination address area on a piece of mail;

means for generating signals representative of characters within the destination address area;

means for calculating the dispersion of a characteristic of characters within only that portion of the destination address consisting of the street name, the city name, and the state name;

means for comparing the calculated dispersion to a predetermined limit; and means for selecting the piece of mail as having a printed address when the dispersion is less than the predetermined limit.

* * * * *